June 17, 1969 R. B. ALLEN 3,450,266
AUTO WASH SYSTEM
Filed Nov. 22, 1966

INVENTOR
RUSSELL B. ALLEN
BY
Barnes, Kisselle, Raisch & Choate
ATTORNEYS

United States Patent Office 3,450,266
Patented June 17, 1969

3,450,266
AUTO WASH SYSTEM
Russell B. Allen, 18253 Evergreen Road,
Detroit, Mich. 48219
Filed Nov. 22, 1966, Ser. No. 596,301
Int. Cl. B01d 35/18, 35/16; C02b 5/00
U.S. Cl. 210—167    9 Claims

ABSTRACT OF THE DISCLOSURE

An auto wash system including a settling tank to which liquid draining from the car is directed, a supply tank from which the liquid is pumped to a heating tank from which it is pumped to nozzles for directing the liquid against the car and a filter unit of novel construction positioned at the surface of the liquid in the settling tank. The pump which directs liquid to the heating tank draws the liquid through the filter unit from the settling tank to the supply tank. The filter unit includes a horizontally extending pipe on which a drum filter unit of novel construction is rotatably mounted. An interconnecting standpipe extends downwardly from the horizontal pipe into the supply tank.

---

This invention relates to an auto wash system and particularly to a system for collecting, filtering and recirculating the liquid that is utilized for washing or rinsing the car.

In the washing of cars by automatic equipment, one of the largest cost factors is the cost of water. It is therefore important to be able to collect and filter the water and recirculate it for use.

Among the objects of the present invention are to provide a car wash system which utilizes a novel method of filtering and circulating the liquid; which is relatively simple and low in cost; which is self-cleaning; and which can be repaired easily and quickly, if necessary.

Basically, the invention disclosed herein provides a settling tank to which liquid draining from the car is directed, a supply tank from which the liquid is pumped to a heating tank from which it is pumped to nozzles for directing the liquid against the car and a filter unit of novel construction positioned at the surface of the liquid in the settling tank. The pump which directs liquid to the heating tank draws the liquid through the filter unit from the settling tank to the supply tank. The filter unit includes a horizontally extending pipe on which a drum filter unit of novel construction is rotatably mounted. An interconnecting standpipe extends downwardly from the horizontal pipe into the supply tank.

Figure 1:
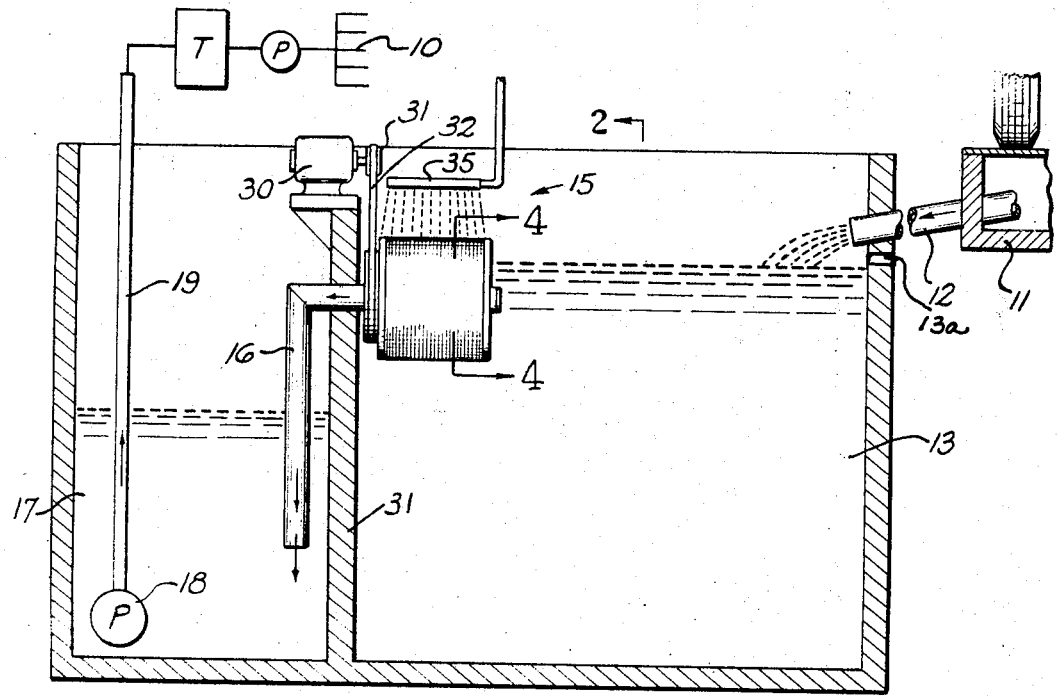
FIG. 1 is a vertical sectional view shown partly diagrammatically of a car wash system embodying the invention.
Figure 2:
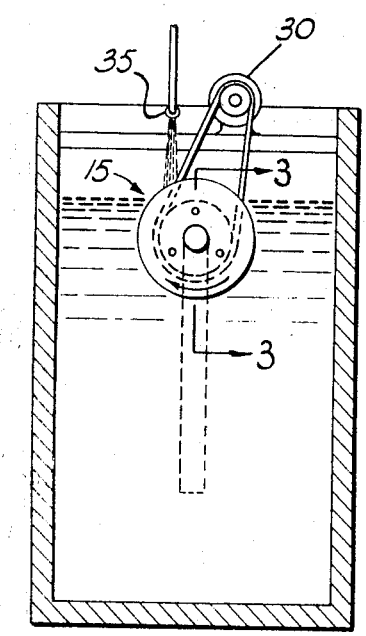
FIG. 2 is a sectional view taken along the line 2—2 in FIG. 1.

Referring to FIG. 1, a car wash system embodying the invention comprises a plurality of high pressure nozzles 10 which are shown diagrammatically that are adapted to direct liquid such as water or a mixture of water and detergent against the surfaces of the automobile. The pressure of the liquid is on the order of 600 pounds or higher. The liquid draining from the automobile is collected in a trough or collecting tank 11 and is directed by a pipe 12 to a settling tank 13.

In the settling tank 13, the heavy portions of dirt and other contaminants settle to the bottom of the tank. The liquid with lighter contaminants therein is thereafter drawn through a filter 15 and passes through a downwardly extending standpipe 16 into a supply tank 17. A pump 18 in the supply tank directs the liquid through a supply line 19 to a heating tank T from the which it is supplied under pressure to nozzles 10 by pump P.

Figure 3:
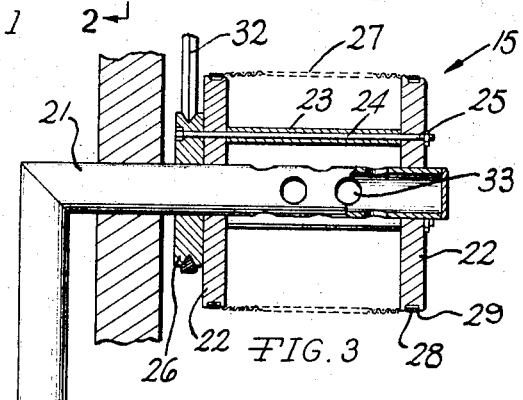
FIG. 3 is a fragmentary sectional view taken along the line 3—3 in FIG. 2.
Figure 4:
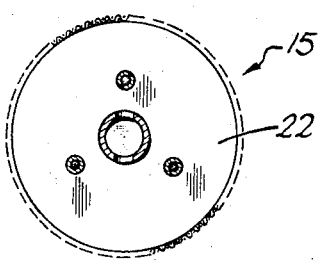
FIG. 4 is a fragmentary sectional view taken along the line 4—4 in FIG. 1.

As shown in FIGS. 3 and 4, the filter unit 15 comprises a pipe 21 which extends horizontally near the upper level of the liquid in the settling tank 13 and has one end closed and the other end connected to standpipe 16. A pair of end members 22 of wood or the like are rotatably mounted on the pipe 21 and are maintained in spaced interconnected relation to the one another by tubular spacers 23 through which bolts 24 extend and on which nuts 25 are threaded. A pulley 26 is also rotatably mounted on the pipe 21 by the bolts 24 adjacent one of the end members 22. A screen 27 is provided between the end members 22 and is maintained thereon by metal bands 28 that clamp the edges of the screen 27 into grooves 29 on the end members 22.

The position of the filter unit 15 is such that the pipe 21 is always submerged and a portion of the filter unit extends above the level of the upper surface of the liquid in the settling tank 13 but at least some portion of the filter unit 15 extends below the upper surface of the liquid in the settling tank 13 throughout all levels of the liquid in the settling tank as they may vary during operation of the car wash. This is insured by an overflow outlet 13a at the maximum permissible level.

A motor 30 is mounted on the wall 31 between the tanks 13, 17 and has a pulley 31 thereon. An endless belt 32 is trained over pulleys 31, 26 to rotate the filter unit 15 as well as maintain the drum of the filter unit in axial position on the pipe 21. The pipe 21 includes a plurality of openings 33 in the portion of the pipe that is between the end members 22.

In operation, the pump 18 draws liquid from the supply tank 17 and supplies it to the nozzles 10. The liquid from the nozzles 10 strikes the surfaces of the automobile and thereafter drains downwardly into the collecting trough 11 and passes to pipe 12 to the settling tank 13. Operation of the pump 18 continuously draws liquid through the screen 27 of the drum of the filter unit, through the pipe 21 and downwardly through the interconnecting standpipe 16 into the supply tank 17.

During this time, the drum unit is continuously rotated by the motor 30 so that successive portions of the surface of the screen 27 are continuously moved into and out of the liquid in the settling tank 13. As each portion of the surface of the screen 27 leaves the upper level of the water, the suction on that portion is nullified so that when a spray of clean water is directed against the screen by a spray pipe 35, dirt and the like, which may have been collected on the screen due to the suction created by the pump 18 through the pipes 16 and 21, is readily washed off so that the drum is thereby continuously cleaned.

The pump 18 continuously supplies a predetermined volume of liquid to the heating tank T. If the liquid in the settling tank 13 should become contaminated by dirt and the like to a greater degree, the tendency of the liquid to pass through the filter 15 will be retarded because there will be a greater tendency for the screen 27 to become clogged or contaminated with dirt. During this time, the pump 18 operating at some set volume will cause the level of the liquid in the supply tank 17 to lower. Since the pipe 16 extends downwardly into the liquid in the supply tank 17, this will, in turn, cause a greater difference in pressure between the lower end of the pipe 16 and the interior of the pipe 21 increasing the suction that is tending to draw liquid through the screen 27. As a result as the liquid in the settling tank 13 becomes more contaminated, a greater pressure differential is applied tending to draw liquid into the drum. The system thus tends to be self-compensating for varying degrees of contamination of the liquid in the settling tank 13. If the liquid then becomes less contaminated, it will be drawn more readily to the filter unit 15 and the level in the supply tank 17 will rise, diminishing pressure differential across the filter unit.

As an example, the system embodying the invention has been utilized successfully with a pump 18 having a capacity of 300 gallons per minute and a drum filter having a screen of 250 mesh and a diameter of 17 inches rotated at 20 r.p.m. The pipes 21, 16 and the openings 33 were sufficiently large so that they offered no substantial restriction to flow.

It can be seen that the system is relatively simple and inexpensive. The drum portion of the filter unit is made of low cost materials and requires no seals, can be readily removed for maintenance and is self-cleaning during normal operation.

I claim:
1. In an auto wash system, the combination comprising
 a plurality of high pressure nozzles for directing liquid against the surfaces of an automobile,
 a settling tank,
 means for collecting the liquid draining from the automobile and directing it to said settling tank,
 means for maintaining a liquid level in said settling tank,
 a supply tank,
 a filter unit mounted for rotation adjacent the upper surface of the liquid in said settling tank,
 said filter unit having a foraminous peripheral surface which is successively moved into and out of the liquid in the settling tank as the filter unit is rotated,
 a pipe extending within said filter unit and having openings therein within said drum whereby suction on said pipe draws liquid through said foraminous portion of the filter unit into said pipe,
 an interconnecting pipe extending from said filter pipe and downwardly into said supply tank with the lower end thereof below the level of liquid in said supply tank,
 a heating tank connected to said nozzles,
 and pump means extending from the liquid in said supply tank to said heating tank for drawing liquid from said supply tank and supplying it to said heating tank whereby when said pump operates and said filter is rotated, liquid is drawn through said filter from said settling tank through said filter pipe and interconnecting pipe through said supply tank and, in turn, through said pump means to said heating tank.

2. The combination set forth in claim 1 including means for spraying liquid against a portion of said foraminous peripheral surface to wash dirt and the like off the periphery of said filter unit as the filter unit rotates.

3. The combination set forth in claim 1 wherein said filter unit comprises a pair of circular end members rotatably mounted on said filter pipe,
 said foraminous portion comprising a cylindrical screen extending between said end members,
 a pulley fixed to one of said end members and mounted for rotation on said filter pipe,
 a motor,
 an endless means extending between said motor and trained over said pulley for rotating said filter unit as well as keeping said filter unit axially in position on said filter pipe.

4. In an auto wash system, the combination comprising
 a plurality of high pressure nozzles for directing liquid against the surfaces of an automobile,
 a settling tank,
 means for collecting the liquid draining from the automobile and directing it to a settling tank,
 means for maintaining a liquid level in said settling tank,
 a supply tank,
 a drum filter unit mounted for rotation on said pipe adjacent the upper surface of the liquid in said settling tank,
 said filter unit having a foraminous peripheral surface which is successively mounted into and out of the liquid in the settling tank as the filter unit is rotated,
 a pipe extending horizontally at the surface of the liquid in said settling tank, said pipe having openings therein whereby suction on said pipe draws liquid through said foraminous portion of the filter unit into said pipe,
 an interconnecting pipe extending from said filter pipe and downwardly into said supply tank with the lower end thereof below the level of liquid in said supply tank,
 a heating tank from which liquid is supplied to the nozzles,
 and pump means extending from the liquid in said supply tank to said heating tank for drawing liquid from said supply tank and supplying it to said heating tank whereby when said pump operates and said filter is rotated, liquid is drawn through said filter from said settling tank through said filter pipe and interconnecting pipe through said supply tank and, in turn, through said pump means to said heating tank.

5. The combination set forth in claim 4 including means for spraying liquid against a portion of said foraminous peripheral surface to wash dirt and the like off the periphery of said filter unit as the filter unit rotates.

6. The combination set forth in claim 4 wherein said filter unit comprises a pair of circular end members rotatably mounted on said filter pipe,
 said foraminous portion comprising a cylindrical screen extending between said end members,
 a pulley fixed to one of said end members and mounted for rotation on said filter pipe,
 a motor,
 and endless means extending between said motor and trained over said pulley for rotating said filter unit as well as keeping said filter unit axially in position on said filter pipe.

7. In a liquid system, the combination comprising
 a settling tank,
 means for maintaining a liquid level in said settling tank,
 a supply tank,
 a filter unit mounted for rotation adjacent the upper surface of the liquid in said settling tank,
 said filter unit having a foraminous peripheral surface which is successively moved into and out of the liquid in the settling tank as the filter unit is rotated,
 a pipe extending within said filter unit and having openings therein within said drum whereby suction on said pipe draws liquid through said foraminous portion of the filter unit into said pipe,
 an interconnecting pipe extending from said filter pipe and downwardly into said supply tank with the lower end thereof below the level of liquid in said supply tank,
 and pump means extending from the liquid in the supply tank upwardly out of said supply tank.

8. The combination set forth in claim 7 including means for spraying liquid against a portion of said foraminous peripheral surface to wash dirt and the like off the periphery of said filter unit as the filter unit rotates.

9. The combination set forth in claim 7 wherein said filter unit comprises a pair of circular end members rotatably mounted on said filter pipe, said foraminous portion comprising a cylindrical screen extending between said end members,
a pulley fixed to one of said end members and mounted for rotation on said filter pipe,
a motor,
and endless means extending between said motor and trained over said pulley for rotating said filter unit as well as keeping said filter unit axially in position on said filter pipe.

References Cited

UNITED STATES PATENTS

| | | | |
|---|---|---|---|
| 1,804,934 | 5/1931 | Hoyt | 210—391 X |
| 2,055,869 | 9/1936 | Manning | 210—297 X |
| 3,188,288 | 6/1965 | Smith | 210—196 X |
| 3,272,338 | 9/1966 | Gallagher | 210—195 X |
| 3,384,239 | 5/1968 | Berardi | 210—167 X |

REUBEN FRIEDMAN, *Primary Examiner.*

JOHN ADEE, *Assistant Examiner.*

U.S. Cl. X.R.

210—181, 256, 391, 416